US009575954B2

(12) United States Patent
Cougias et al.

(10) Patent No.: US 9,575,954 B2
(45) Date of Patent: Feb. 21, 2017

(54) STRUCTURED DICTIONARY

(71) Applicant: Unified Compliance Framework (Network Frontiers), Lafayette, CA (US)

(72) Inventors: Dorian J. Cougias, Oakland, CA (US); Matthew Zulch, Oakland, CA (US); Vicki McEwen, Oakland, CA (US); Erwin Rydell, Oakland, CA (US); Erik Granlund, Oakland, CA (US); Steven Piliero, Oakland, CA (US)

(73) Assignee: Unified Compliance Framework (Network Frontiers), Lafayette, CA (US)

( * ) Notice: Subject to any disclaimer, the term of this patent is extended or adjusted under 35 U.S.C. 154(b) by 0 days.

(21) Appl. No.: 14/963,063

(22) Filed: Dec. 8, 2015

(65) Prior Publication Data

US 2016/0306789 A1    Oct. 20, 2016

Related U.S. Application Data

(60) Provisional application No. 62/150,237, filed on Apr. 20, 2015.

(51) Int. Cl.
*G06F 17/00* (2006.01)
*G06F 17/27* (2006.01)

(52) U.S. Cl.
CPC ......... *G06F 17/2735* (2013.01); *G06F 17/271* (2013.01); *G06F 17/278* (2013.01); *G06F 17/2795* (2013.01)

(58) Field of Classification Search
CPC  G06F 17/278; G06F 17/2735; G06F 17/2795; G06F 17/28
USPC .......................................................... 704/9
See application file for complete search history.

(56) References Cited

U.S. PATENT DOCUMENTS 5,745,776 A * 4/1998 Sheppard, II ..... G06F 17/30952
707/E17.037
6,675,169 B1 * 1/2004 Bennett ............. G06F 17/30625
6,966,030 B2 * 11/2005 Ashford ................ G06F 17/278
704/251

(Continued)

FOREIGN PATENT DOCUMENTS

WO         2008121382       10/2008

OTHER PUBLICATIONS

International Search Report and Written Opinion for counterpart PCT Application No. PCT/US2016/026787, mailed Jul. 22, 2016 (15 pages).

*Primary Examiner* — Daniel Abebe
(74) *Attorney, Agent, or Firm* — Perkins Coie LLP

(57) ABSTRACT

A dictionary data structure is described. The data structure is made up of first, second, and third tables. The first table is comprised of entries each representing a natural language term, each entry of the first table containing a term ID identifying its term. The second table is comprised of entries each representing a definition, each entry of the second containing a definition ID identifying its definition. The third table is comprised of entries each representing correspondence between a terminate definition defining the term, each entry of the third table containing term ID identifying the defined term and a definition ID identifying the defining definition. The contents of the data structure are usable to identify any definitions corresponding to a term.

6 Claims, 3 Drawing Sheets

(56) References Cited

U.S. PATENT DOCUMENTS

| | | | |
|---|---|---|---|
| 7,869,989 B1 * | 1/2011 | Harvey | G06F 17/2735 |
| | | | 704/10 |
| 8,108,207 B1 * | 1/2012 | Harvey | G06F 17/2735 |
| | | | 704/10 |
| 2003/0067498 A1 | 4/2003 | Parisi | |
| 2005/0080780 A1 | 4/2005 | Colledge et al. | |
| 2007/0088683 A1 | 4/2007 | Feroglia et al. | |
| 2008/0208563 A1 | 8/2008 | Sumita | |

\* cited by examiner

STRUCTURED DICTIONARY

CROSS-REFERENCE TO RELATED APPLICATION(S)

The present application claims the benefit of U.S. Provisional Patent Application No. 62/150,237, filed on Apr. 20, 2015, which is hereby incorporated by reference in its entirety.

The present application is related to the following applications, each of which is hereby incorporated by reference in its entirety: U.S. Provisional Patent Application No. 61/722,759 filed on Nov. 5, 2012; and U.S. patent application Ser. No. 13/723,018 filed Dec. 20, 2012, now issued as U.S. Pat. No. 9,009,197.

In ways in which the present application and documents incorporated herein by reference are inconsistent, the present applications controls.

TECHNICAL FIELD

The described technology is directed to the fields of natural language processing and analysis.

BACKGROUND

Many fields of business are subject to extensive, complex bodies of regulations. As one example, the field of Information Technology is subject to myriad international and local laws, administrative rules and guidelines, standards, and other forms of regulation relating to data security and privacy, export control, data formats, identity authentication and authorization of people and machines, among other subjects.

DETAILED DESCRIPTION

Figure 1:
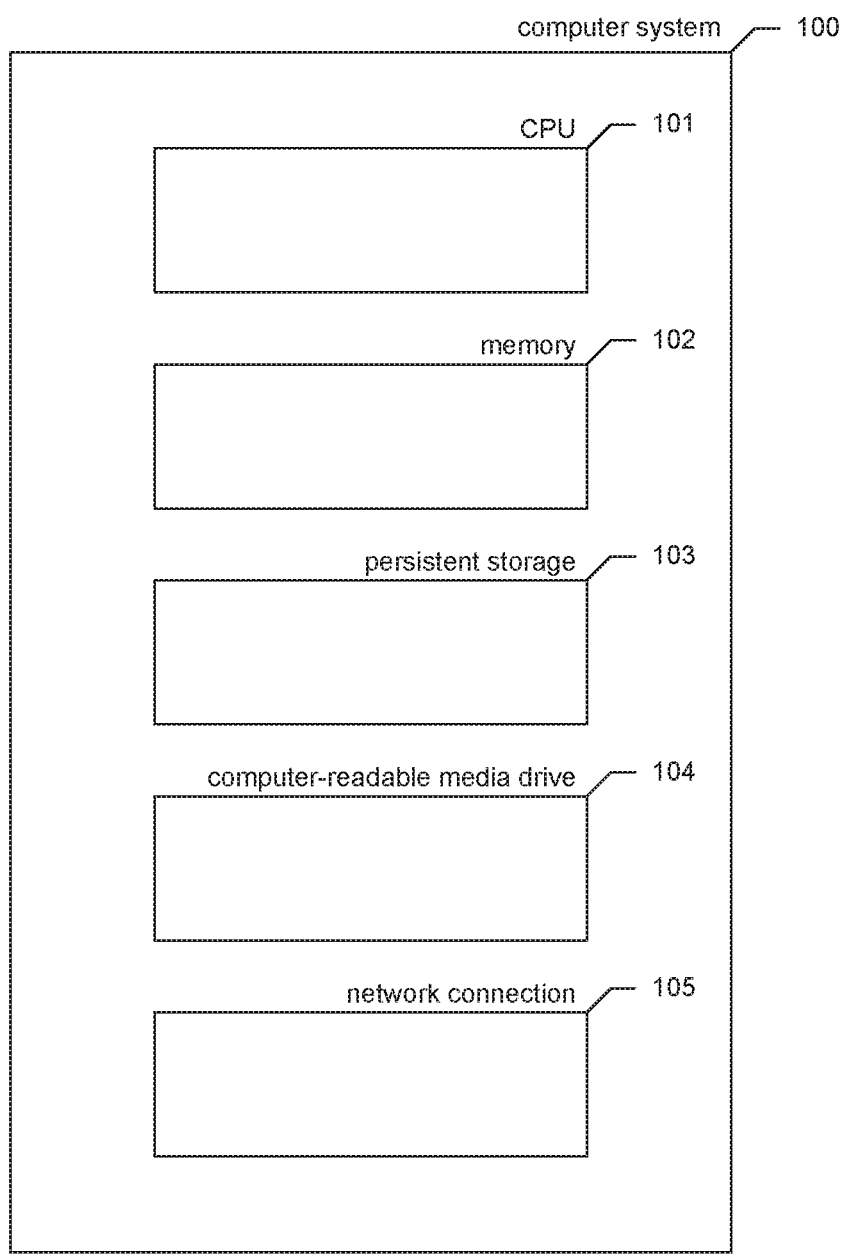
FIG. 1 is a block diagram showing some of the components typically incorporated in at least some of the computer systems and other devices on which the facility operates.

The inventors have observed that is difficult and expensive to comply with extensive, complex bodies of regulations, and have recognized that automated governance tools for ensuring compliance with such regulations would have significant utility.

A body of regulations in a particular field of business is very often the collective product of a large number of documents—statutes, treaties, administrative rules, industry standards—referred to herein as authority documents. Each such authority document can impose its own requirements. Content of certain authority documents can affect the meaning of other authority documents. The inventors recognized that an effective automated governance tool is much more likely to be effective if it based on a coordinated understanding of all of the authority documents and how they fit together.

The inventors further recognized that manually establishing such a coordinated understanding of all of the authority documents and how they fit together can itself be an incredibly difficult and expensive task—especially where the set of authority documents is continuously evolving—and that conventional tools for generating an understanding of arbitrary text are ill-suited to derive a complete and accurate understanding of requirements established across a large number of authority documents. In particular, they found such conventional tools as Part of Speech Taggers, Named Entity Taggers, and Natural Language Processors to operate in too general and casual a way, often relying on static, general-purpose dictionaries that intersect inadequately with the linguistic domains of many sets of authority documents; that lack kinds of information needed to do a good job of understanding these authority documents and discerning the requirements they impose; and that often contain information from other domains that tends to confound the process of understanding the authority documents in their own domain. In particular, the dictionaries used by such tools typically fail to capture many kinds of useful information about and relationships between words, including words that are alternate versions of one another, and words that are Named Entities.

Accordingly, the inventors have conceived and reduced to practice a type of dictionary for use in understanding documents imposing requirements ("the dictionary"), and a software and/or hardware facility for constructing, maintaining, and applying such a dictionary ("the facility"). The dictionary is designed to manage multiple definitions for each term it defines, and recognize and resolve ambiguities in the spelling and/or phrasing of defined terms. The dictionary represents complex hierarchies of terms, based on both directional and bidirectional relationships of various types between terms.

In various embodiments, the dictionary supports identification of named entities, such as by Named Entity (NE) engines; identification of parts of speech, parts of speech (POS) taggers; and text parsing, including sense disambiguation, such as by Natural Language Processing (NLP) engines. These, in turn, assist in the process of mapping "citations"—each a portion of an authority document—each to one of a set of harmonized controls that are the basis for compliance efforts and compliance certification.

Named Entities are definite noun phrases that refer to specific types of individuals, such as organizations, persons, dates, and so on, and are often used by Natural Language Processing engines. Named Entities can be used to determine the difference between "contract" and "contracts," (beyond the plurality of the second): tying the definition of the first to the Named Entity of a particular record example and the definition of the second other to the named entity of an entire record category makes it clear that the first refers to a particular contract, while the second refers to all contracts.

When tagging a sentence and adding Named Entity recognition to the sentence, this way of curating meaning aids in teaching the Natural Language Processing engine how and in what part of the sentence, terms are most often used. It can change the difference in correct recognition from 60% to 70%, for example.

Within compliance frameworks such as the UNIFIED COMPLIANCE FRAMEWORK, Named Entity recognition allows a mapper to see which pieces of evidence are necessary to carry out a control. By tagging terms as record example or asset, governance risk and compliance tools can then parse out which evidence needs to be supported for which controls.

Parts of Speech taggers are similar to Named Entity engines and focus on parts of speech beyond nouns, such as verbs, pronouns, adjectives and adverbs, and are extensible and trainable whereas NE engines generally are not.

The dictionary tracks usage of terms and their curated tagging to send that information to the Natural Language Processor, showing that 90% of the time when a sentence starts with "report" it doesn't mean the loud bang of a gun or explosion.

Beyond simple Parts of Speech tagging, complex Parts of Speech tagging coupled with Named Entity recognition significantly assists the Natural Language Processor. As an example, a Named Entity taggers tagging the word "audit" as a Named Entity task in the same sentence as the word "computer" tells the Natural Language Processor that there's a high degree of probability the next time it sees the two together that the word "audit" doesn't mean to informally attend a class of some type, but rather corresponds to this Named Entity.

Natural Language Processors in their native form tend to accurately process sentences at a rate of 60%; when combined with the NE and POS engines and curated content described herein, their sentence-processing accuracy reaches approximately 85%. In order to be taught, they must be enhanced with curated content and a dictionary structure that allows them to scan the structure and curated content and add new heuristic rules as they go. They can learn, but they have to learn in a structured manner. The dictionary is well-suited to do this.

In some embodiments, the facility tracks, for each term, the frequency with which it occurs in each of one or more different corpuses of documents, and/or in each of one or more different types of document corpuses. In some embodiments, the facility tracks, for each definition of a term, the frequency with which the facility selects the definition for occurrences of the term in each of one or more different corpuses of documents, and/or in each of one or more different types of document corpuses.

In some embodiments, the facility tracks and maps nonstandard terms, and harmonized terms. In particular, among a set of two or more similar terms having the same meaning, the facility identifies a harmonized term as being preferred for usage.

In some embodiments, the dictionary is organized as follows:

Term names are stored in A dictionary_terms table. Definitions are stored in A dictionary_definitions table. A term in the dictionary_terms table is connected to each definition of the term in the dictionary_definitions table through a dictionary_terms_to_dictionary_definitions table.

A list of word types, such as noun, verb, adjective, etc. or any specific named entity (also called "UCF elements") related to auditing Record Example, Triggering event, etc. are stored in a dictionary_word_types table, which is connected directly to the dictionary_definitions table.

Plurals, possessives, plural possessives, pasts, past participles, and all other conjugations of words are stored in a dictionary_other_forms table, which is linked to the corresponding term in the dictionary_terms table.

The types of possible other forms are stored in a dictionary_other_form_types table. The dictionary_other_form_types table is connected directly to the dictionary_other_forms table.

Acronyms for term names are stored in an acronym table. The dictionary_terms table is connected to the acronym table through a dictionary_terms_to_acronyms table.

Synonyms and Antonyms are stored in the dictionary_terms_same_level table. The dictionary_terms_same_level table is connected directly to the dictionary_terms table. Each record of the dictionary_terms_same_level table connects 2 rows of the dictionary_terms table as synonyms or antonyms. All other relationships between terms are stored in the dictionary_terms_hierarchy table, which is connected directly to the dictionary_terms table.

A blacklisted_linguistic_relationship_terms table contains term names that excluded from the automatic parent/child relationships we suggest for our term hierarchy mostly smaller common words like "a", "the", etc. The blacklisted_linguistic_relationship_terms table is connected directly to the dictionary_terms table.

In some embodiments, the facility performs natural language parser training using sentence data, including sentence data contained in tables such as a sentence table, a tagged phrase table, a sentence dependencies table, etc.

By operating in some or all of the ways described above, the facility supports accurate automatic understanding of authority documents as a basis for discerning a set of coordinated requirements from the authority documents.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
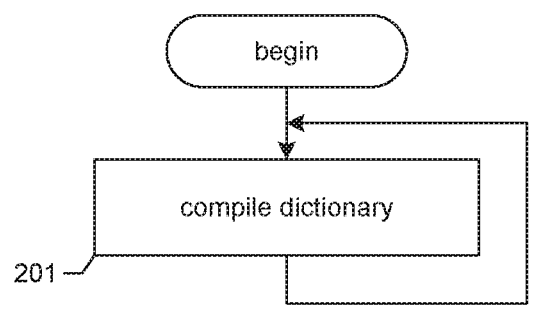
FIG. 2 is a flow diagram showing steps performed by the facility in some embodiments to maintain the dictionary.

FIG. 2 is a flow diagram showing steps performed by the facility in some embodiments to maintain the dictionary. In step 201, the facility compiles the dictionary based upon observations from authority documents in the subject-matter domain of the body of regulations to be understood. In some embodiments, after step 201, the facility repeats step 201 to continue compiling the dictionary.

Those skilled in the art will appreciate that the steps shown in FIG. 2 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Figure 3:
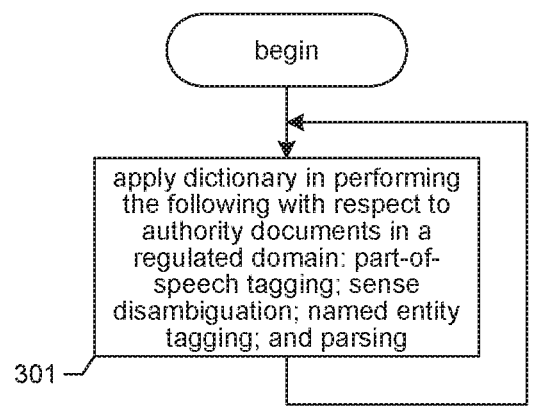
FIG. 3 is a flow diagram showing steps performed by the facility in some embodiments to maintain the dictionary.

FIG. 3 is a flow diagram showing steps performed by the facility in some embodiments to maintain the dictionary. In step 301, the facility applies the dictionary compiled by the facility in accordance with FIG. 2 and performing a variety of kinds of processing of authority documents in the corresponding domain: part-of-speech tagging, named entity tagging, sense disambiguation, and parsing. In some embodiments, after step 301, the facility repeats step 301 to continue applying the dictionary to additional and/or revised authority documents.

In some embodiments, the facility characterizes dictionary terms using parts of speech such as the following: Noun, Verb, Adjective, Adverb, Preposition, Conjunction, Pronoun, Interjection, Prefix, Combining form, Abbreviation, Contraction, Adjective suffix, Article, Verb suffix, Noun suffix, Phrase, Asset, cDoc, Configurable Item, Data Contents, Metric, Organizational, Function, Organizational Task, Record Category, Record Example, Role Definition, Title, Configuration Setting, Organization, Authority Document, Limiting Term, Group, Triggering Event.

In some embodiments, the facility establishes relationships between terms and the dictionary using a rich selection of relationship types, such as the following: Is Part of, Contains, Is a Type of, Is a Category for, Is Used to Create/Is Created by, Is Used to Enforce/Is Enforced by, References/Is Referenced by. In some embodiments, the facility further stores in the dictionary a reason for establishing at least some of its relationships between terms.

For example, in some embodiments, the facility establishes relationships of types such as the following: X Is Part of Y, X Contains Y (which shows Y is a part of X), X Is a Type of Y, X Is a Category for Y (which shows Y is a type of X), X Is Used to Create Y, X Is Created by Y (which shows Y is used to create X), X Is Used to Enforce Y, X Is Enforced by Y (which shows Y is used to enforce X), X References Y, X Is Referenced by Y (which shows Y references X).

Figure 4:
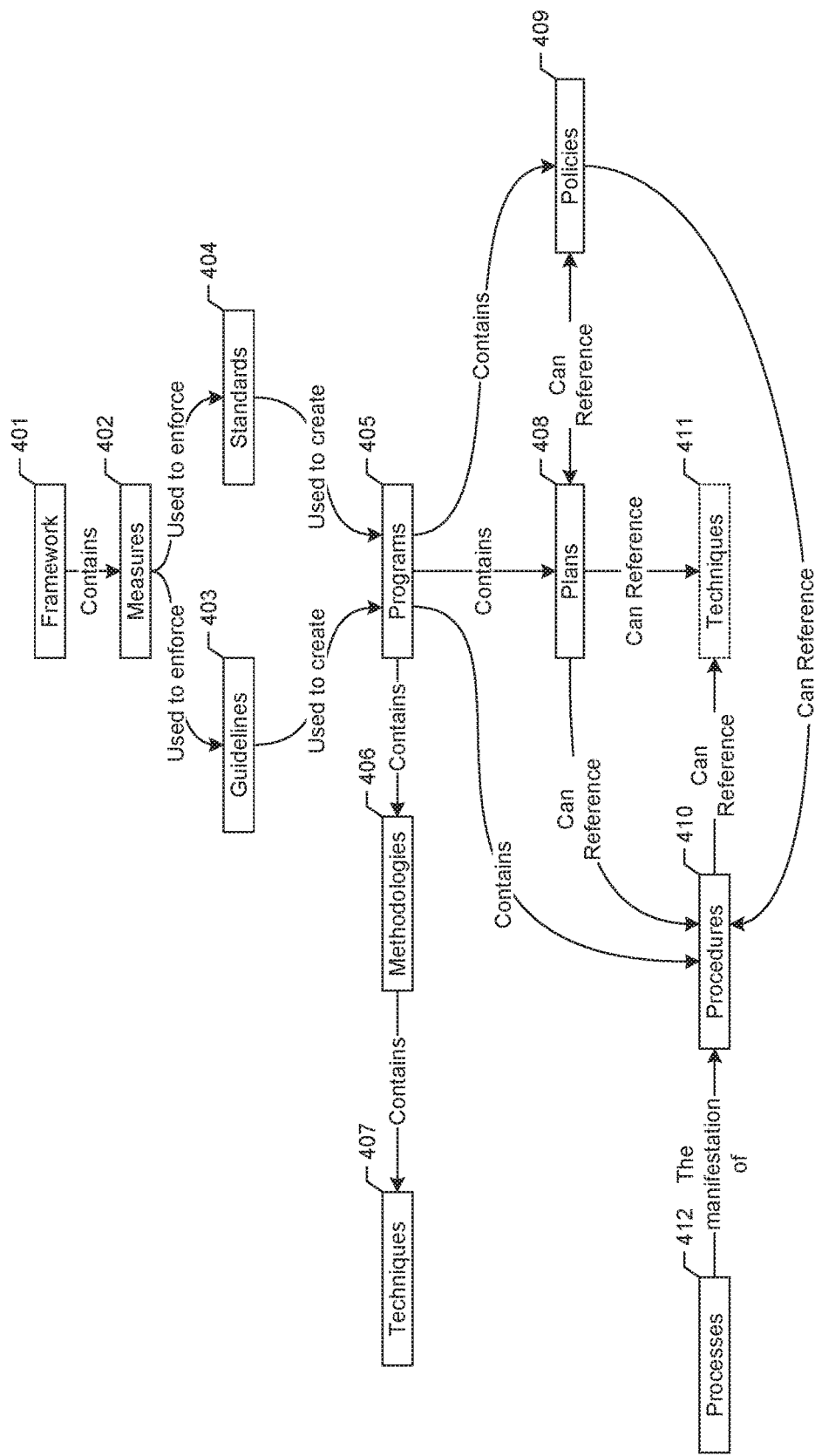
FIG. 4 is a data structure diagram showing a graph showing sample relationships between terms in the dictionary.

FIG. 4 is a data structure diagram showing a graph showing sample relationships between terms in the dictionary. For example, can be seen that Framework 401 and Measures 402 are related in that Framework 401 contains Measures 402. As another example, Measures 402 are used to enforce both Guidelines 403 and Standards 404.

The following table shows, for each term shown in FIG. 4, how the terms relate in the hierarchy established by the dictionary.

| Reference Number | Term | Description | Example | Element Type |
|---|---|---|---|---|
| 401 | Framework | The overall documented structure and template that the organization can use to create and maintain something (it defines the scope, objectives, activities, and structure) | "An organization's physical security framework provides a systematic approach to create an physical security plans, policies, and procedures." | cDoc |
| 402 | Measures | Are used to enforce guidelines and standards. | "The organization can create and implement a security awareness training program as a measure to enforce industry standards regarding physical security." | noun |
| 403 | Guideline | A documented recommendation of how an organization should do something. (Inspiration for Programs, policies, etc.) | 1. "The organization could follow an industry guideline on physical security to create an their policies, procedures, plans, etc. 2. A large organization could write an internal physical security guideline for each of their facilities to interpret for the creation and implementation of their policies, procedures, plans, etc." | Record Example |
| 404 | Standard | A documented goal or ideal an organization uses to determine their compliance with something. | 1. Army Regulation 380-19: "Information Systems Security defines how a computer room should be set up to decrease the risk of fire and protect against unauthorized access. 2. A large organization could write an internal physical security standard that defines how two-factor authentication techniques should be implemented." | Record Example |
| 405 | Program | A documented listing of procedures, schedules, roles and responsibilities, and plans/instructions to be performed to complete/implement something. | "An organization could create a security awareness and training program to educate personnel on the proper procedures and who to report issues to." | Record Example |

| Reference Number | Term | Description | Example | Element Type |
|---|---|---|---|---|
| 406 | Methodology | Business strategy of how to approach something. (how to we approach creating a framework, policy, etc.) | 1. "The organization could choose to use two-factor authentication to restrict access to organizational facilities. This methodology enhances security by making unauthorized access more difficult. 2. The organization could choose to adopt the principle of least privilege. This methodology would result in procedures such as giving personnel access only to facilities they require to perform their job." | noun |
| 407, 411 | Technique | The use of a specific technology or procedure to achieve something in alignment with the organization's methodologies. (usually when there are multiple paths for an Organization to take) | "An organization could choose to use a biometric authentication technique, such as fingerprint readers, as part of their two-factor authentication methodology." | noun |
| 408 | Plan | A step-by-step outline of the processes and procedures to be performed to complete or implement something. | "An organization's fire safety plan outlines the procedures personnel should perform in the event of a fire." | Record Example |
| 409 | Policy | The business rules and guidelines of the organization that ensure consistency and compliance with something. | "An organization's physical security policy contains the considerations an organization must take into account when creating procedures for handling and securing IT assets and securing facilities that house IT assets from unauthorized entries and environmental disasters." | Record Example |
| 410 | Procedure | A detailed description of the steps necessary to implement or perform something in conformance with applicable standards. A procedure is written to ensure something is implemented or performed in the same manner in order to obtain the same results. | "An organization's physical security procedure defines the processes the organization uses to restrict access to its facilities, such how visitors are handled, how security badges are distributed, etc." | Record Example |
| 412 | Process | Activities performed while following the documented procedures. | "The actions performed while giving visitors access to organizational facilities in accordance with the organization's defined visitor access procedure." | noun |

In some embodiments, the dictionary is comprised of the following interconnected tables:

dictionary_terms (DI): This table is where dictionary term names are stored.

Properties

| Field | Description |
|---|---|
| DI_id | The unique identification number assigned to each term name upon its creation. |
| DI_live_status | Indicates whether the term is live or not. 1 = live, 0 = not live |
| DI_deprecated_by | The DI_id of the term name record that supersedes a deprecated term name record. Only used when a term name is deprecated. |
| DI_deprecation_notes | The reason for deprecating a term name such as, "Duplicate", "Does not meet quality standards", "Remapped", etc. Only used when a term name is deprecated. |
| DI_date_added | The date the term name was created. |
| DI_date_modified | The date of the most recent edit to the record. |

-continued

| Field | Description |
|---|---|
| DI_language | The language the content is in. |
| DI_name | The term name connecting to the term name ID. |
| DI_description | Contains: nonstandard forms under the "Alternate Spellings" heading; Broader Terms (type of, part of, and linguistic child of); Synonyms and Antonyms; Definitions (just the definition text, not the word type). This field is not used internally; it exists for the XML specification that uses a single field for a glossary term's definition. |
| i_DI_harmonized_to_id | Only used when a term is nonstandard, this is the ID of the standard term. |
| i_DI_stripped_name | This is the name of the term with all spaces, punctuation, accent marks, etc. removed. It's used for searching in certain cases. |

Referenced by these Tables:
DICTIONARY_TERMS_TO_DICTIONARY_DEFINITIONS
DICTIONARY_OTHER_FORMS
DICTIONARY_TERMS_TO_ACRONYMS
DICTIONARY_TERMS_SAME_LEVEL
DICTIONARY_TERMS_HIERARCHY
BLACKLISTED_LINGUISTIC_RELATIONSHIP_TERMS dictionary_definitions (DD): This table is where dictionary definitions are stored.
Properties

| Field | description |
|---|---|
| DD_id | The unique identification number assigned to each definition upon its creation. |
| DD_live_status | Indicates whether the definition is live or not. 1 = live, 0 = not live |
| DD_deprecated_by | The DD_id of the definition record that supersedes a deprecated definition record. Only used when a dictionary definition is deprecated. |
| DD_deprecation_notes | The reason for deprecating a definition such as, "Duplicate", "Does not meet quality standards", "Remapped", etc. Only used when a definition is deprecated. |
| DD_date_added | The date the definition was created. |
| DD_date_modified | The date of the most recent edit to the record. |
| DD_definition | The definition connecting to the definition id. |
| WT_id | The id of the word type connecting to the definition entry. |
| DOF_id | The id of the other forms connecting to the definition entry. |

Referenced by these Tables:
DICTIONARY_TERMS_TO_DICTIONARY_DEFINITIONS
DICTIONARY_OTHER_FORMS
DICTIONARY_WORD_TYPES dictionary_terms_to_dictionary_definitions (DI_to_DD): This table connects dictionary term names to definitions. The ids of both the dictionary term (DI_ID) and the dictionary definition (DD_ID) are stored in this table.
Properties

| Field | description |
|---|---|
| DI_to_DD_id | The unique identification number assigned to each term name to definition relationship upon its creation. |
| DI_to_DD_live_status | Indicates whether the term name to definition relationship is live or not. 1 = live, 0 = not live |
| DI_to_DD_date_added | The date the term name to definition relationship was created. |
| DI_to_DD_date_modified | The date of the most recent edit to the record. |
| DI_id | The id of the dictionary term name connecting to the definition. |
| DD_id | The id of the definition connecting to the term name. |

Referenced by these Tables:
DICTIONARY_TERMS
DICTIONARY_DEFINITIONS dictionary_word_types (WT): This table stores word types parts of speech and UCF named entities (elements).
Properties

| Field | description |
|---|---|
| WT_id | The unique identification number assigned to each word type. |
| WT_name | The unique name of word type that correlates with the id. |
| WT_live_status | Indicates whether the word type is live or not. 1 = live, 0 = not live. |
| WT_date_added | The date the word type entry was created. |
| WT_date_modified | The date of the most recent edit to the record. |
| WT_base_type | The word type a subset word type should behave as. For example Assets are a special kind of Noun, so they have a base type of 1, which is the ID for the Noun type. This field is used for NLP tagging to determine which other forms workflow to use in our OMT (Online Mapping Tool). |

Referenced by these Tables:
DICTIONARY_OTHER_FORM_TYPES
DICTIONARY_DEFINITIONS
Each definition has a word type which is stored in the WT_ID field in the DICTIONARY_DEFINITIONS table.

| WT_id | WT_name |
|---|---|
| 1 | Noun |
| 2 | Verb |
| 3 | Adjective |
| 4 | Adverb |
| 5 | Preposition |
| 6 | Conjunction |
| 7 | Pronoun |
| 8 | Interjection |
| 9 | Prefix |
| 10 | Combining form |
| 11 | Abbreviation |
| 12 | Contraction |
| 13 | Adjective suffix |
| 14 | Article |
| 15 | Verb suffix |
| 16 | Noun suffix |
| 17 | Phrase |
| 19 | Asset |
| 20 | cDoc |

| WT_id | WT_name |
|---|---|
| 21 | Configurable Item |
| 22 | Data Contents |
| 24 | Metric |
| 26 | Organizational Function |
| 27 | Organizational Task |
| 28 | Record Category |
| 29 | Record Example |
| 30 | Role Definition |
| 31 | Title |
| 32 | Configuration Setting |
| 33 | Organization |
| 34 | Authority Document |
| 35 | Limiting Term |
| 36 | Group |
| 37 | Triggering Event |

In some embodiments, "Metric" shown above is omitted from the word types used by the facility.

dictionary_other_forms (DOF): This table stores other forms of terms such as plural, possessive, plural possessive, past, past participle, present participle, third person, future tense, plural past, plural past participle, plural present participle, and plural future tense.

Properties

| Field | description |
|---|---|
| DOF_id | The unique identification number assigned to each other form upon its creation. |
| DOF_name | The unique name of other form that correlates with the id. |
| DOF_live_status | Indicates whether the other form is live or not: 1 = live, 0 = not live. |
| DOF_date_added | The date the dictionary other form entry was created. |
| DOF_date_modified | The date of the most recent edit to the record. |
| DOF_is_irregular | Indicates whether the other form is irregular: 1 = irregular, 0 = regular. |
| OFT_id | The id of the other form type connecting to dictionary other form entry. |
| DI_id | The id of the term name connecting to the dictionary other form entry. |

Referenced by these Tables:

DICTIONARY_TERMS

DICTIONARY_DEFINITIONS

DICTIONARY_OTHER_FORM_TYPES dictionary_other_form_types (OFT): This table stores all possible types of other forms.

Properties

| Field | description |
|---|---|
| OFT_id | The unique identification number assigned to each other form type. |
| OFT_name | The name of the other form type. |
| OFT_live_status | Indicates whether the other form type is live or not. 1 = live, 0 = not live. |
| OFT_date_added | The date the other form type was created. |
| OFT_date_modified | The date of the most recent edit to the record. |
| WT_id | The word type connecting to the other form type. |

| OFT_ID | OFT_NAME |
|---|---|
| 1 | Plural |
| 2 | Past |
| 3 | Third Person |
| 4 | Present Participle |
| 5 | Past Participle |
| 6 | Comparative |
| 7 | Superlative |
| 8 | First Person |
| 9 | Second Person |
| 10 | Plural Past |
| 11 | Plural Possessive |
| 12 | Possessive |
| 13 | Future Tense |
| 14 | Plural Past Participle |
| 15 | Plural Present Participle |
| 16 | Plural Future Tense |
| (17) | Plural Third Person tense |

Each other form has an other form type which is stored in the OFT ID field in the DICTIONARY_OTHER_FORMS table. In some embodiments, the facility uses other form types corresponding to grammatical tenses defined at the phrase level, such as "plural future," which refers to a phrase where a noun or nouns are pluralized and the verb is in the future tense. Such other form types assist the facility in detecting phrases that all refer to the same concept despite being phrased differently.

Other forms also have a word type which is stored in the WT_ID field in the DICTIONARY_OTHER_FORMS table.

Referenced by these Tables:

DICTIONARY_WORD_TYPES

DICTIONARY_OTHER_FORMS acronyms (AC): This table stores acronyms.

Properties

| Field | description |
|---|---|
| AC_id | The unique identification number assigned to each acronym upon its creation. |
| AC_name | The name of the acronym connecting to the acronym id. |
| AC_live_status | Indicates whether the acronym is live or not. 1 = live, 0 = not live |
| AC_deprecated_by | The AC_id of the acronym record that supersedes a deprecated acronym record. Only used when an acronym is deprecated. |
| AC_deprecation_notes | The reason for deprecating an acronym such as, "Duplicate", "Does not meet quality standards", "Remapped", etc. Only used when an acronym is deprecated. |
| AC_date_added | The date the acronym was created. |
| AC_date_modified | The date of the most recent edit to the record. |
| AC_language | The language the content is in. |
| AC_license_info | The URL to license information for the owner of the content. Typically this is the UCF. |

Table Connecting to

DICTIONARY_TERMS_TO_ACRONYMS dictionary_terms_to_acronyms (DI_to_AC): This table connects the acronym table to dictionary_terms table.

Properties

| Field | description |
|---|---|
| DI_to_AC_id | The unique identification number assigned to each term name to acronym relationship upon its creation. |

-continued

| Field | description |
| --- | --- |
| DI_to_AC_live_status | Indicates whether the term name to acronym relationship is live or not. 1 = live, 0 = not live. |
| DI_to_AC_date_added | The date the term name to acronym relationship was created. |
| DI_to_AC_date_modified | The date of the most recent edit to the record. |
| AC_id | The id of the acronym connecting to the dictionary term name. |
| DI_id | The id of the dictionary term name connecting to the acronym. |

Referenced by these Tables:
ACRONYM
DICTIONARY_TERMS
blacklisted_linguistic_relationship_terms (BL): This table contains list of terms that should be excluded from the automatic parent/child relationships we suggest for the term hierarchy mostly smaller common words like "a", "the", etc.
Properties

| Field | description |
| --- | --- |
| BL_id | The unique identification number assigned to each blacklisted linguistic relationship term upon its creation. |
| BL_live_status | Indicates whether the blacklisted linguistic relationship term is live or not. 1 = live, 0 = not live. |
| BL_date_added | The date the blacklisted linguistic relationship term was created. |
| BL_date_modified | The date of the most recent edit to the record. |
| DI_id | The id of the dictionary term name connecting to the blacklisted linguistic relationship term. |

Referenced by these Tables:
DICTIONARY_TERMS
dictionary_terms_same_level (DI_same_level): This table contains synonyms and antonyms relationships between terms.
Properties

| Field | description |
| --- | --- |
| DI_same_level_id | The unique identification number assigned to terms same level relationship upon its creation. |
| DI_same_level_live_status | Indicates whether the terms same level relationship is live or not. 1 = live, 0 = not live. |
| DI_same_level_date_added | The date the terms same level relationship was created. |
| DI_same_level_date_modified | The date of the most recent edit to the record. |
| DI_same_level_type | Identifies whether the relationship is synonym or antonym: 1 = synonym, 2 = antonym. |
| DI_id_1 | The id term name of one of the terms in the relationship. |
| DI_id_2 | The id term name of one of the terms in the relationship. |

Referenced by these Tables:
DICTIONARY_TERMS
dictionary_terms_hierarchy (DI_hierarchy): This table contains relationships between terms.
Properties

| Field | description |
| --- | --- |
| DI_hierarchy_id | The unique identification number hierarchy relationship upon its creation. |
| DI_hierarchy_live_status | Indicates whether the hierarchy relationship is live or not. 1 = live, 0 = not live. |
| DI_hierarchy_date_added | The date the hierarchy relationship was created. |
| DI_hierarchy_date_modified | The date of the most recent edit to the record. |
| DI_hierarchy_type | Identifies the type of relationship: 3 = type of, 4 = part of, 5 = linguistic child of. |
| DI_child | The id of the child term name in the hierarchy relationship. |
| DI_parent_id | The id of the parent term name in the hierarchy relationship. |

Direction of relationship depends on which term is the parent and which is the child.
Example:
DI_HIERARCHY_TYPE: 3
DI_CHILD: Microsoft
DI_PARENT: software
Microsoft is a type of software and software is a category for Microsoft.
Referenced by these Tables:
DICTIONARY_TERMS
It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:
1. A computer-readable storage medium, that is not a signal, encoded with a computer program performing a method for identifying a plurality of alternate definitions for a distinguished natural language term, the method comprising:
  identifying, among entries of a first table each representing a natural language term, an entry representing the distinguished natural language term;
  accessing, in the identified entry of the first table, a term ID uniquely identifying the term to which the identified entry of the first table corresponds;
  identifying, among entries of a second table each representing correspondence between a term and a definition defining the term, a plurality of entries each containing the accessed term ID;
  accessing, in each of the identified entries of the second table, a definition ID uniquely identifying a definition;
  for each of the accessed definition IDs, identifying, among entries of a third table each representing a definition, an entry containing the accessed definition ID, the third table being distinct from the second table;
  for each of the identified entries of the third table, accessing in the identified entry of the third table a natural language representation of the definition represented by the entry of the third table; and
  attributing the accessed definition natural language representations to the distinguished natural language term.
2. The computer-readable storage medium of claim 1, the method further comprising:

in a distinguished one of the identified entries of the third table, accessing a word type ID identifying a word type to which its definition corresponds;

identifying among entries of a fourth table each representing a word type, an entry containing the accessed word type ID; and attributing of the identified entry of the fourth table to the definition natural language representation accessed in the distinguished entry of the third table.

3. The computer-readable storage medium of claim 1, the method further comprising:

identifying, among entries of the fourth table each representing a literal term form, and entry representing a literal term form in which the distinguished natural language term was encountered in a sentence; and accessing, in the identified entry of the fourth table, a term ID identifying a term to which its literal term form corresponds, and wherein the selected rows of the third table contain the term ID accessed in the identified entry of the fourth table.

4. A method in a computing system for determining a relationship between a first term and a second term, the method comprising:

identifying, among entries of a first table each representing a natural language term, a first entry representing the first term;

accessing, in the first entry of the first table, a first term ID uniquely identifying the term to which the first entry of the first table corresponds;

identifying, among entries of the first table, a second entry representing the second term;

accessing, in the second entry of the first table, a second term ID uniquely identifying the term to which the second entry of the first table corresponds;

identifying, among entries of a second table each representing a relationship between a pair of terms, an entry containing both the first term ID and the second term ID;

accessing, in the identified entry of the second table, an indication of a relationship type between the first and second terms; and attributing the accessed indication of a relationship type to the first term and the second term.

5. The method of claim 4 wherein the attributed relationship type is directional as between the first term and the second term.

6. The method of claim 4 wherein the attributed relationship type is bidirectional as between the first term and the second term.

* * * * *

UNITED STATES PATENT AND TRADEMARK OFFICE
CERTIFICATE OF CORRECTION

PATENT NO. : 9,575,954 B2  
APPLICATION NO. : 14/963063  
DATED : February 21, 2017  
INVENTOR(S) : Cougias et al.

Page 1 of 1

It is certified that error appears in the above-identified patent and that said Letters Patent is hereby corrected as shown below:

In the Specification

In Columns 5-6, Line 34, after "structure)" insert -- . --.

In Columns 5-6, Line 45, after "create" delete "an".

In Columns 7-8, Line 66, after "not live" insert -- . --.

In Column 9, Line 42, after "not live" insert -- . --.

In Column 10, Line 9, after "not live" insert -- . --.

In Column 12, Line 17, delete "(17)" and insert -- 17 --, therefor.

In Column 12, Line 43, after "not live" insert -- . --.

Signed and Sealed this  
Twenty-fifth Day of April, 2017

Michelle K. Lee  
*Director of the United States Patent and Trademark Office*